United States Patent
Dietz et al.

(10) Patent No.: US 7,072,587 B2
(45) Date of Patent: Jul. 4, 2006

(54) COMMUNICATION USING BI-DIRECTIONAL LEDS

(75) Inventors: Paul H. Dietz, Hopkinton, MA (US);
William S. Yerazunis, Acton, MA (US); Darren L. Leigh, Belmont, MA (US); Giovanni Vannucci, Red Bank, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 613 days.

(21) Appl. No.: 10/126,761

(22) Filed: Apr. 19, 2002

(65) Prior Publication Data

US 2004/0208632 A1   Oct. 21, 2004

Related U.S. Application Data

(63) Continuation-in-part of application No. 10/115,299, filed on Apr. 3, 2002, now Pat. No. 6,664,744.

(51) Int. Cl.
*H04B 10/00* (2006.01)

(52) U.S. Cl. .............................. 398/138; 398/135
(58) Field of Classification Search ............. 398/135, 398/138
See application file for complete search history.

(56) References Cited

U.S. PATENT DOCUMENTS

| 5,268,635 | A  | * | 12/1993 | Bortolini et al. | 324/96 |
| 5,631,757 | A  | * | 5/1997 | Bodeep et al. | 398/138 |
| 6,559,788 | B1 | * | 5/2003 | Murphy | 341/164 |
| 6,701,091 | B1 | * | 3/2004 | Escobosa et al. | 398/107 |

* cited by examiner

*Primary Examiner*—Jason Chan
*Assistant Examiner*—Nathan Curs

(74) *Attorney, Agent, or Firm*—Dirk Brinkman; Andrew J. Curtin

(57) ABSTRACT

An optical communications transceiver includes an LED coupled in series with a resistor. A microprocessor has one I/O pin connected to the LED. In a first mode or transmit mode, the LED is periodically driving in forward bias to emit light to transmit data. In a second or receive mode, the LED is periodically not driven in reverse bias, e.g., reverse bias or zero bias. Then, the LED is allowed to change charge of the capacitance of the LED's junction using a photocurrent. The change in charge is measured using a timer. When the change in charge exceeds a predetermined threshold, input light is sensed. Thus, the LED can be used to receive data in the second mode.

14 Claims, 6 Drawing Sheets

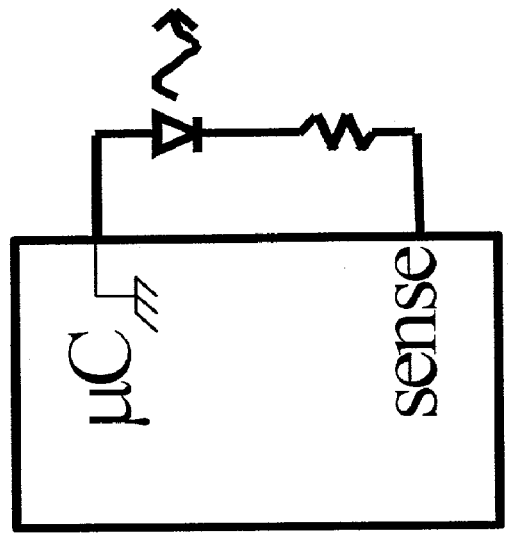
*Fig. 3c* "Discharge"
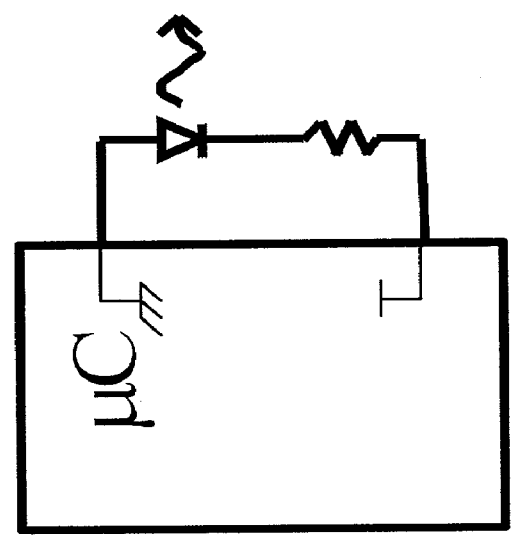
*Fig. 3b* "Reverse Bias"
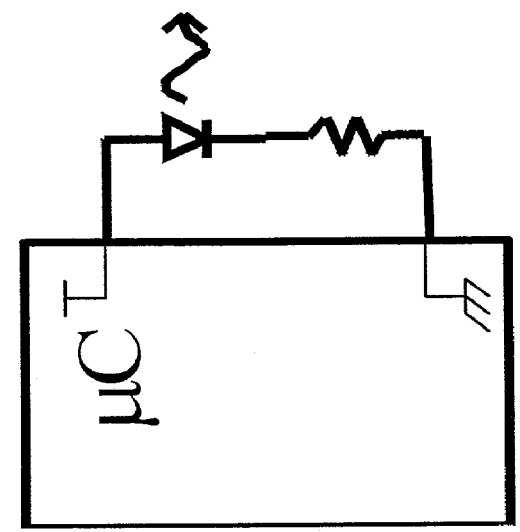
*Fig. 3a* "Light"

COMMUNICATION USING BI-DIRECTIONAL LEDS

RELATED APPLICATION

This application is a continuation-in-part application of U.S. patent application, Ser. No. 10/115,299 now U.S. Pat. No. 6,664,744 "Automatic Backlight for Handheld Devices," filed by Dietz on Apr. 3, 2002.

FIELD OF THE INVENTION

This invention relates generally to light emitting diodes (LEDs), and more particularly to LEDs used for bi-directional optical communications.

BACKGROUND OF THE INVENTION

Light emitting diodes (LEDs) are inexpensive and widely used as light sources. Their diverse applications include numeric displays, flashlights, liquid crystal backlights, vehicle brake lights, traffic signals, backlights, and the ubiquitous power-on indicator light on almost every electronic device, and modern electrical appliance.

Because LEDs are most often used as light emitters, it is easy to forget that they can also operate as photodiodes, i.e., light detectors. Although most LEDs are designed as light emitters, and not light detectors, all LEDs can effectively operate in either mode.

This interchangeability between solid-state light emission and light detection was first described in the 1970's, but has since been largely forgotten by LED users, see Mims, "*Siliconnections: Coming of Age in the Electronic Era*," McGraw-Hill, New York, N.Y., 1986, and Mims, "*LED Circuits and Projects*," Howard W. Sams and Co., Inc., New York, N.Y., 1973.

Light emitting diodes emit light in a fairly narrow frequency band when a small current is applied in the correct direction through the diode, i.e., with a forward bias. Because the current-voltage characteristic is exponential, it is difficult to control a voltage applied directly across an LED accurately enough to attain a desired current.

Therefore, some means must be provided to limit the current. In discrete electronic systems, this is typically done by placing a resistor in series with the LED. Because most microprocessor I/O pins can sink more current than they can source, the configuration shown in the FIG. 1 is the most common way of driving an LED from a microprocessor or microcontroller.

FIG. 1 shows a typical prior art LED emitter circuit 100. An I/O pin 101 of a microprocessor 100 is used to sink current through an LED 102 with a resistor 103 to limit the amount of current.

One important application that uses LEDs is optical signal communications. In most prior art optical communications applications, an LEDs is used in the transmitter, and a photodiode is used in the receiver. In addition, Each component is typically driven separately by a specially designed circuit. The photodiodes are most often specifically designed to receive optical signals in a specific narrow frequency range. Most photodiodes cannot emit light. Consequently, there is one circuit that drives the transmitter, and another circuit for driving the receiver. This increases the cost and complexity of the communications system.

Therefore, it is desired to provide a light emitting diode that can be used as both a transmitter and receiver in an optical communications system.

SUMMARY OF THE INVENTION

An optical communications transceiver includes an LED coupled in series with a resistor. A microprocessor has at least one I/O pin connected to the LED. In a first mode or transmit mode, the LED is periodically driving in forward bias to emit light to transmit data. In a second or receive mode, the LED is periodically not driving in reverse bias, e.g., reverse bias or zero bias, and then allowed to change charge of the capacitance of the LED's junction using a photo-current. The change in charge is measured using a timer. When the change in charge exceeds a predetermined threshold, input light is sensed. Thus, the LED can be used to receive data in the second mode.

BRIEF DESCRIPTION OF THE DRAWINGS

FIGS. 3a–c shows the circuit of FIG. 2 operating in forward bias, not forward bias, and discharge modes, respectively;

DETAILED DESCRIPTION OF THE PREFERRED EMBODIMENT

Dual Pin LED Data Transceiver

Figure 2:
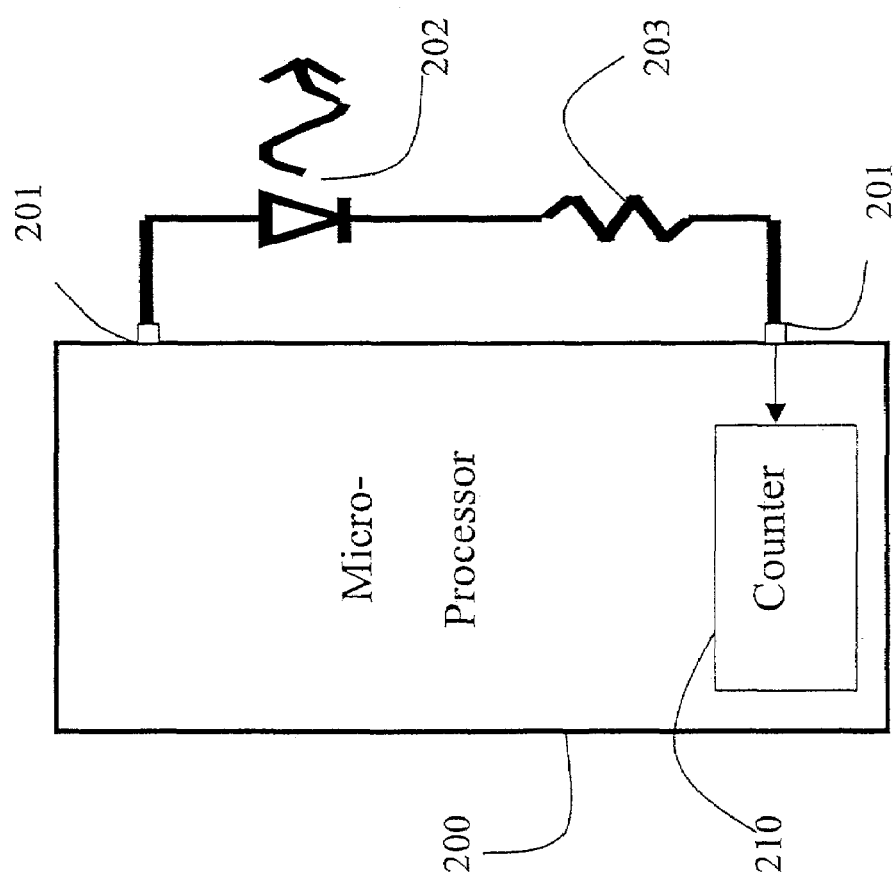
FIG. 2 is a schematic of an LED emitter/detector circuit according to the invention.

FIG. 2 shows an LED emitter/detector circuit according to the invention. Here, an LED 202 and resister 203 are coupled in series between two I/O pins 201 of a microprocessor or microcontroller 200. Now both ends of the LED/resistor circuit 202-203 are connected to the microprocessor 200. The I/O pin can be set low (0V), high (5V), or the pin can be used as an input, using conventional programming techniques.

Operating Modes

FIGS. 3a–c show how this circuit can operate in three modes, forward bias or "light," not forward bias or "reverse bias" and "discharge," or sense respectively. In the light mode of FIG. 3a, the LED operates conventionally and emits light. The emitted light can be modulated to transmit data. In reverse bias mode of FIG. 3b, the normal emitting polarities are switched to reverse bias the junction of the diode. By then releasing one end in discharge mode of FIG. 3c, i.e., setting that end to be an input to the microprocessor, an optically generated photo-current can optically discharge the junction at a rate proportional to the amount of received or sensed light. If the sensed light is modulated, then data can be received. The capacitive discharge can easily be measured. Because Q=CV, and C is known, measuring the change in charge effectively measures the change in voltage.

At some point, the voltage on the input pin crosses a predetermined input threshold T. By timing how long this takes, a high-resolution measurement of the sensed light level is made. The time measurement can be simply done by a counter 210 or clock signal in the microprocessor 200. For example, a small program loop that alternatively increments the counter 210 and until the threshold T is exceeded.

The circuit according to the invention requires no addition components, and draws extremely little power during sensing. By switching between emitting and sensing modes, the LED can operate both as a transmitter and a receiver (transceiver) in an optical communications network.

Figure 4:
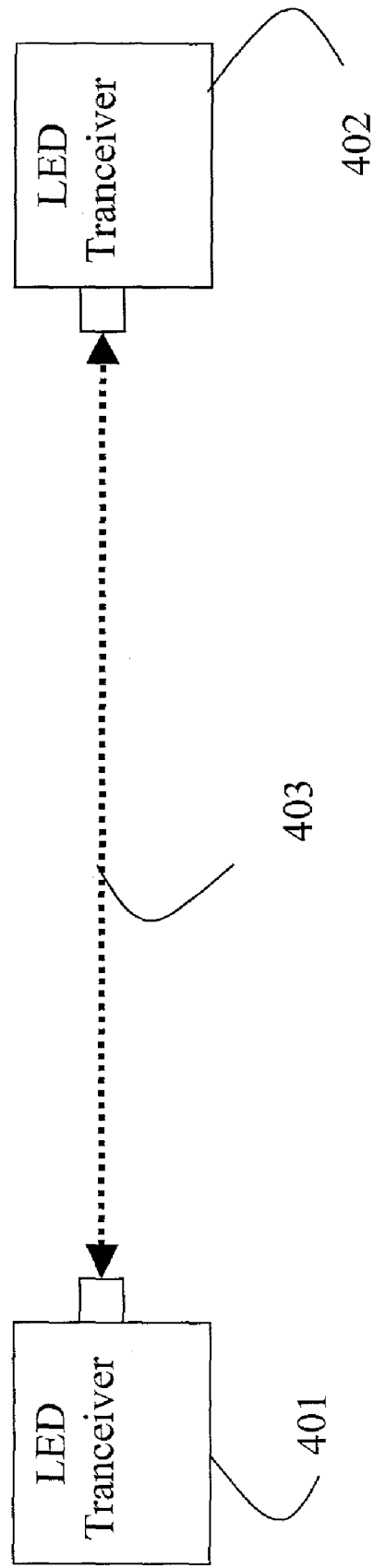
FIG. 4 shows multiple LED based transceivers coupled in a communications network.

FIG. 4 shows two such transceivers 401–402 connected by an optical link 403. The link 403 can be any transparent medium such as air, or an optical fiber cable.

Single Pin LED Transceiver

Figure 5:
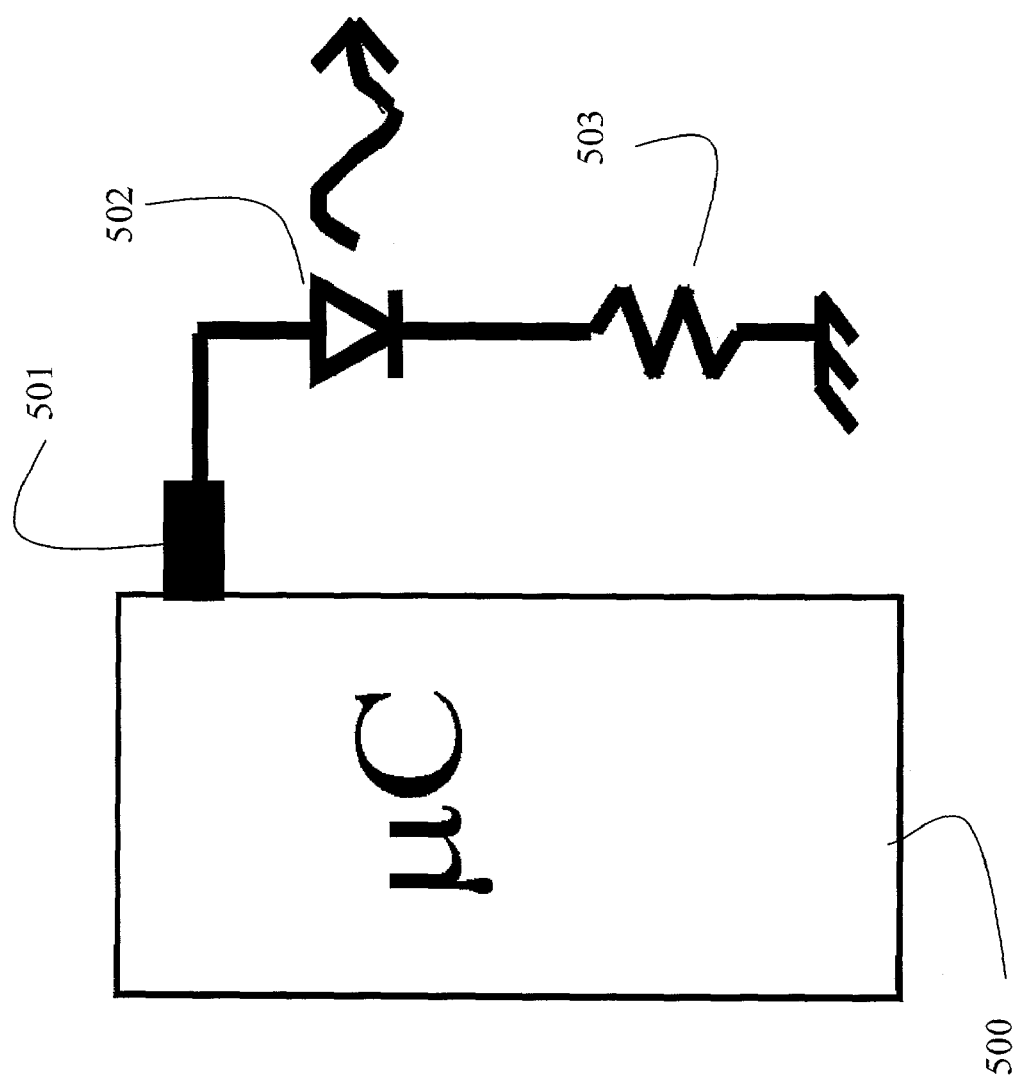
FIG. 5 is a schematic of an alternative embodiment of the LED emitter/detector circuit using a single I/O pin according to the invention.

Surprisingly, it is also possible to construct a single LED transceiver by using only a single I/O pin of the microprocessor as shown in FIG. 5.

As shown in FIG. 5, a microprocessor or microcontroller 500 has one I/O pin 501 connected to the input of the LED 502, and the output of the LED is connected to a current limiting resistor 503. In this circuit, it is not possible to reverse bias the LED 502, as above for the circuit of FIG. 2. Instead the LED is shorted to zero bias by setting the I/O pin 501 to low.

Then, the pin 501 is set to input, which charges the LED's junction's capacitance when a photo-current induced by incident light is sensed. This continues until the voltage across the LED forward-biases the junction enough to effectively use up all of the photo-current inside the LED. If this voltage is made to pass a predetermined digital input threshold, the same basic timing technique can be used as described above to receive data.

However, this is a difficult constraint. Standard red, green, orange and yellow LEDs typically "turn-on" at around 1.5V to 2V, which is generally below digital input thresholds on 5V systems, such as the microprocessor 500. However, blue LEDs, and some newer high brightness LEDs can have forward voltage drops around 3V, which is high enough to allow it to charge past the input threshold. Lower voltage systems, e.g., 3V systems or lower, have lower input thresholds, so they are more amenable to this technique.

Figure 1:
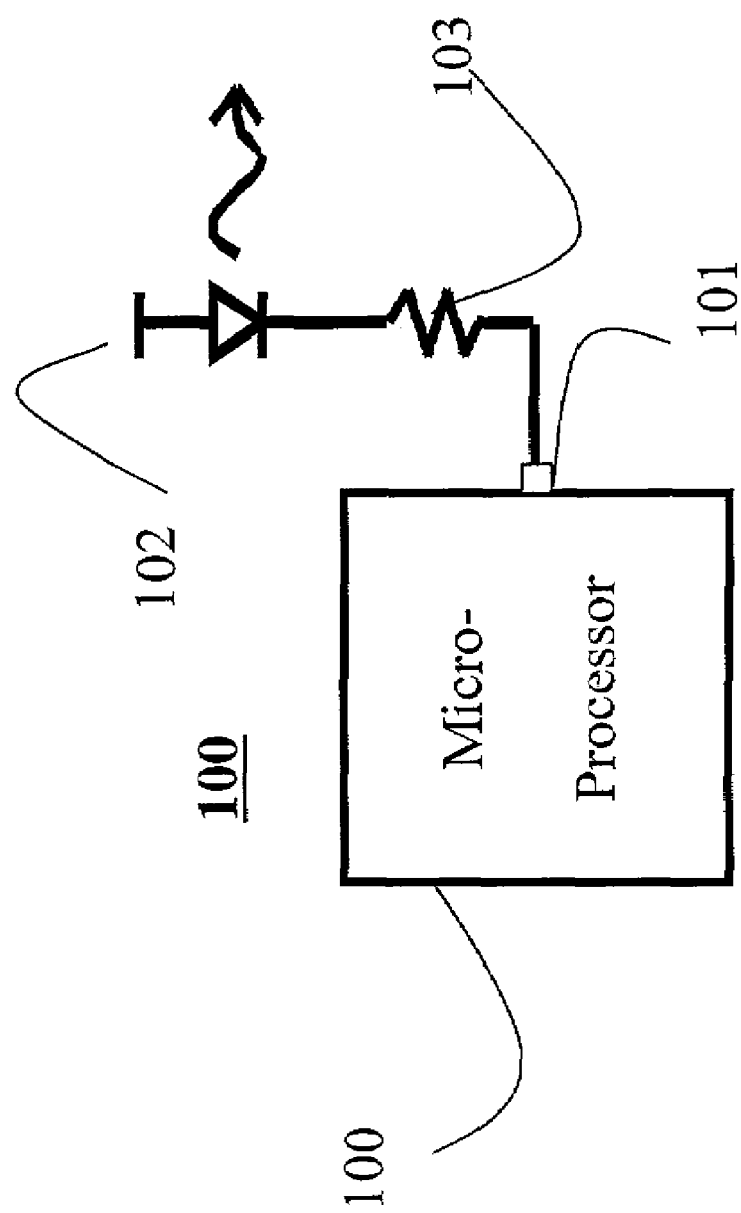
FIG. 1 is schematic of a prior art light emitter circuit.

Also, the circuit in FIG. 5 is generally superior to that of FIG. 2 because thresholds are often biased closer to ground than the supply voltage $V_{DD}$. It should be noted that the one pin version can be operated in reverse with the resistor connected to the I/O pin 501 as in FIG. 1.

The advantage of the pin transceiver is that any suitable LED indicator driven by a single pin of a microprocessor, as many are, can now also operate as a transceiver simple by changing the firmware or software to operate as described above. No alteration of the hardware is required. Therefore, it is easy to upgrade standard LED indicator to also function as a transceiver by a software change. This embodiment is also suited for systems where the number of I/O pins is limited.

Bi-Directional Communications

In one communications application, two unsynchronized transceivers phase-lock to each other and exchange pulse-width-modulated data bi-directionally. In this protocol, the two receivers take turns to operate in transmit and receive mode, and a relatively short light pulse indicates a 0 or space state, and a relatively long light pulse indicates a 1 or mark state.

Idle Cycle

This protocol starts in an idle cycle with the transceiver performing an idling cycle. In the idle cycle, the transceiver transmits a one millisecond light pulse followed by a four millisecond receive period. During the receive period, the transceiver executes multiple light measurements. These light measurements provide only a one bit of resolution, i.e., whether the incoming light flux is above or below a predetermined threshold, nominally about 1.5V.

Synchronization Loop

The idling cycle continues until at least two measurement times in succession indicate "light seen." At this point, the transceiver assumes an incoming pulse of light from another transceiver has been detected, and shifts from the idling loop to a slightly faster synchronizing loop. During the synchronizing loop, the transmitted light pulse is still one millisecond ON, but followed by a variable number of light measurements. When in the synchronizing loop, the microprocessor terminates the measurement set after either a predetermined number of measurements, or when the trailing edge of a light pulse is detected. A trailing edge is considered to be found when a pair of back-to-back measurements both indicate "light seen" followed by ten measurements without "light seen."

The execution pattern inside the synchronize loop is therefore composed of one transceiver's LED on for one millisecond, then a one millisecond period with both LEDs off, followed by the other transceiver's LED on for one millisecond, and finally both LEDs off for one millisecond. Even if the transceivers have clock frequency errors of up to 25%, they will still be able to synchronize. The nominal synchronize loop pulse rate is 250 Hz, with a 25% duty cycle.

Data Communications

During communication, data bits are transmitted in asynchronous form. For example, a one millisecond light pulse, indicates a MARK and a 0.5 millisecond light pulse indicates a SPACE. The system normally idles with MARK bits being transmitted. Here, the operation of the data transfer loop is the same as the synchronize loop. During data transmission, the format is at least 16 MARK bits to allow synchronization, then a single SPACE as a start bit, followed by eight bits of data, followed by one MARK as a stop bit. This is similar to the common 8-N-1 RS-232 format.

To decode the light pulses, the receiving transceiver keeps a count of "light seen" measurements for each execution of the synchronize loop. If seven or fewer light-seen measurements are counted, then a SPACE is recorded; if eight or more pulses are counted, then a MARK is recorded. The usual asynchronous deframing, i.e., dropping the leading SPACE start bit and the trailing MARK stop bit, can be performed. The resulting 8-bit data word is then available to the application-level program. Simple data communications can also be combined with error correction and encryption. Other optical communications protocols are also possible.

Figure 6:
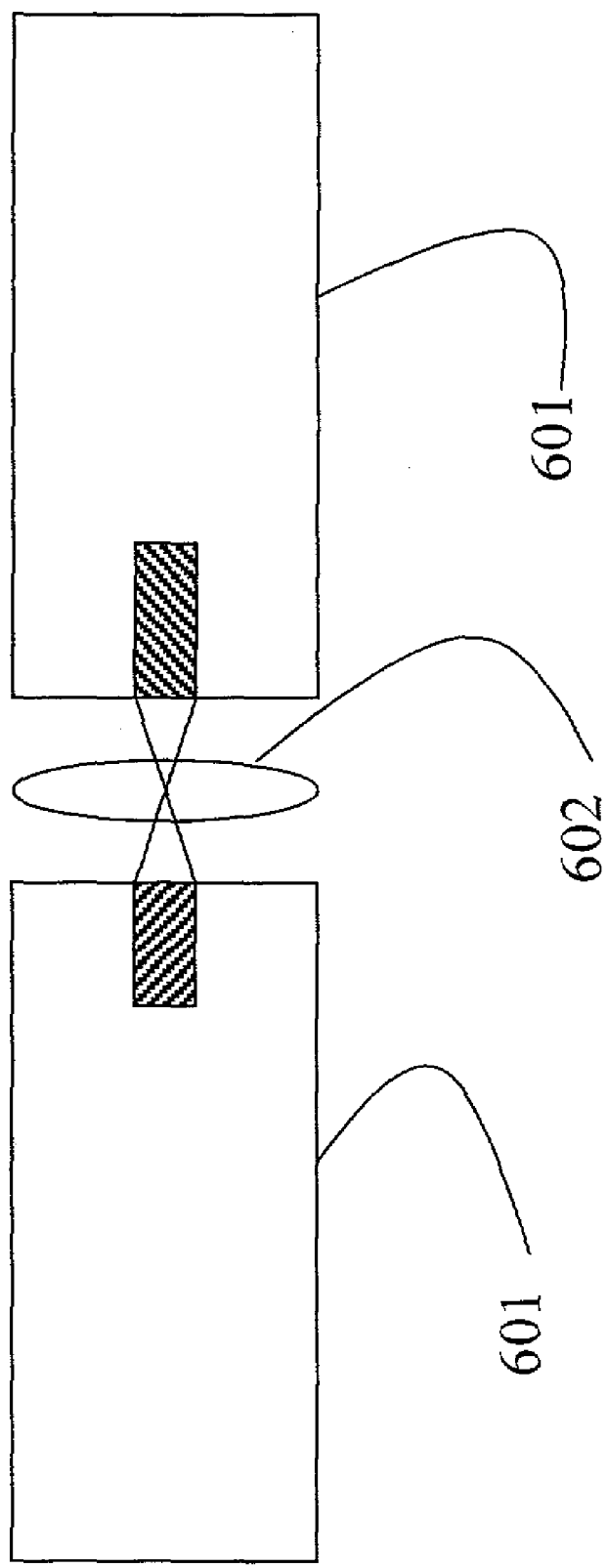
FIG. 6 is a block diagram of two transceivers exchanging optically modulated data via a double convex lens according to an embodiment of the invention.

As shown in FIG. 6, wherein two transceivers 601 exchange optically modulated data via a double convex lens 602, to provide an electrically isolated communications link, data rate in excess of 1 MHz can be achieved.

Programmable Key

The transceiver according to the invention can also be used as a programmable key and programmable lock. Although many other technologies are used in intelligent keys, e.g., RFID, card-keys, etc., the transceiver according to the invention requires no physical contact so there is no wear unlike in some card-key systems, and not magnetic stripe. Unlike RF systems, it is can be made directional and short range so that the user has complete control over what is being unlocked. This allows a single key to be used for many different locks without the possibility of unlocking the wrong lock just because it is nearby. Because the transceiver is inherently bi-directional, challenge and response and encryption protocols can be used, which can make the key very difficult to copy or spoof. The visible nature of the LED allows for some user interface. At the very least, the user can easily tell whether the transceiver is operating or if the battery is dead. Additionally, when used as a key, the transceiver also operates simultaneously as a flashlight.

Perhaps, the most interesting, advantage is that transceiver is capable of peer-to-peer communication. Any transceiver can pass information or authorization to another transceiver. In this case, the transceiver can learn an unlock code, and pass that code to other transceivers. This ability to pass information along is unique, and not a capability of smart cards or RFID tags.

Authentication and Security

In some applications, the peer-to-peer ability to transfer information or authorization is desirable. In other applications, such as financial and other secure transactions, authentication is as important as the data transfer itself, and the uncontrolled passing of authority must be prevented. An unfortunate side effect of the programmable nature of the transceiver is that there is no guarantee that another transceiver will respect any "do not forward" data tags that may be inserted by an application. Non-transferable authorization and unforgeable proof-of-identity are difficult problems with many subtleties.

However, simple cryptography is possible and can be used to keep the transceivers transactions secure from eavesdropping and spoofing. The microprocessor used has sufficient power to implement common symmetric cryptographic algorithms. These require the transmitter and receiver to share a secret key so communication between any two transceivers is configured in advance. The transceiver can be equipped with sufficient memory to hold many symmetric encryption keys and can therefore be set up to communicate with a large number of other transceivers.

Zero-Knowledge Proof

Zero-knowledge proofs (ZKP) and public-key (or asymmetric) cryptography enable the transceiver to securely prove its identity and communicate with any transceiver that had access to published information, see Schneier, "*Applied Cryptography*," 2nd edition, John Wiley and Sons, New York, N.Y., 1996, pp. 101–111. No shared secrets are necessary.

With the transceiver according to the invention, any LED can easily be converted to a communications transceiver. This has broad implications because LEDs are widely used as power-on indicators in microprocessor-based transceivers. The indicator is usually not wired directly to the power supply, but is connected through the microprocessor so that a minimal user interface, e.g., some blinking, is available.

Here are some applications that can use the LED transceiver according to the invention.

A CRT monitor can blink its power light to indicate a low-power "sleep" state. Newer CRT monitors are usually equipped with USB, both to control monitor settings. Adding the transceiver circuit according to the invention can provide a complete data path from the power LED to a nearby computer, allowing the transceiver to be used as a key, as described above. This can be used instead of or, in addition to a password to log in to the computer, or could be used as a cryptographic authentication transceiver for e-commerce. A similar technique could be used with keyboard indicator lights.

With the transceiver, a user can copy a full diagnostic state of a malfunctioning appliance via the power-on LED, and transmit the diagnostic information to a service site. No special display or connector are required on the appliance.

The transceiver can be used to exchange phone numbers or other personal information using the power indicator or LED backlight of cell phones, PDAs, and the like. One interesting application has the transceiver embedded in toys, e.g., stuffed animals, so that the toys can "communicate" with each other.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An optical communications transceiver, comprising:
   means for periodically driving an LED in forward bias to emit light to transmit data;
   means for periodically not driving the LED in forward bias; and means for measuring a time interval, the time interval dependent on a change in capacitance of the LED, the change in capacitance proportional to an amount of light sensed by the LED, wherein the LED is coupled in series with a resistor and a microprocessor having a first I/O pin connected to the LED and a second I/O pin coupled to the resistor, and in which the microprocessor includes the means for periodically driving the LED in forward bias and the means for periodically not driving the LED in forward bias and the means for measuring the time interval.

2. The transceiver of claim 1 wherein the LED is driven in reverse bias and then capacitively discharged with a photo-current to measure the level of light.

3. The transceiver of claim 1 wherein the LED is driven in zero bias and then capacitively charged with a photo-current to measure the level of light.

4. The transceiver of claim 1 further comprising a plurality of transceivers coupled by a transparent medium.

5. The transceiver of claim 1 further comprising:
   phase-lock means for synchronizing the transceiver with another transceiver.

6. The transceiver of claim 1 wherein a first transceiver is embedded in a programmable key, and a second transceiver is embedded in a programmable lock.

7. The transceiver of claim 1 wherein the LED additionally operates as a power-on indicator when emitting light.

8. The transceiver of claim 1 wherein the LED is connected to the means for measuring via a resistor.

9. The transceiver of claim 1 wherein the LED is embedded in an appliance.

10. An optical communications transceiver, comprising:
an LED coupled in series with a resistor;
a microprocessor having a first I/O pin connected to the LED and a second I/O pin coupled to the resistor, in which the microprocessor further comprises:
means for periodically driving the LED in forward bias to emit light to transmit data;
means for periodically driving the LED in reverse bias;
means for measuring a time interval, the time interval dependent on a change in capacitance of the LED, the change in capacitance proportional to an amount of light sensed by the LED.

11. An optical communications transceiver, comprising:
an LED coupled in series with a resistor;
a microprocessor having an I/O pin connected to the LED and ground coupled to the resistor, in which the microprocessor further comprises:
means for periodically driving the LED in forward bias by setting the I/O pin to high to emit light for transmitting data;
means for periodically driving the LED in zero bias by setting the I/O pin to low, and then setting the I/O pin to input to optically charge the LED; and
means for measuring a time interval, the time interval dependent on a change in capacitance of the LED, the change in capacitance proportional to an amount of light sensed by the LED.

12. An optical communications transceiver, comprising:
an LED coupled in series with a resistor;
a microprocessor having an I/O pin connected to the resistor and ground coupled to the LED in which the microprocessor further comprises:
means for periodically driving the LED in forward bias by setting the I/O pin to high to emit light for transmitting data;
means for periodically driving the LED in zero bias by setting the I/O pin to low, and then setting the I/O pin to input to optically charge the LED; and
means for measuring a time interval, the time interval dependent on a change in capacitance of the LED, the change in capacitance proportional to an amount of light sensed by the LED.

13. A method for transceiving data, comprising: periodically driving an LED in forward bias to emit light to transmit data, in which the LED is coupled in series with a resistor, and a microprocessor has an I/O pin connected to the resistor and ground coupled to the LED;
periodically not driving the LED in forward bias, and then optically changing a charge of a capacitance of the LED after not driving the LED in forward bias; and
measuring a time interval, the time interval dependent on a change in capacitance of the LED, the change in capacitance proportional to an amount of light sensed by the LED.

14. The method of claim 13, in which the measuring is performed by a counter of the microprocessor.

* * * * *